United States Patent
Okuda et al.

(10) Patent No.: US 6,741,415 B1
(45) Date of Patent: May 25, 2004

(54) METHOD OF WRITING SERVO SIGNAL ON MAGNETIC TAPE

(75) Inventors: Shinsuke Okuda, Ichikai-machi (JP); Takashi Ishii, Yokohama (JP)

(73) Assignee: Quantum Corporation, San Jose, CA (US)

(*) Notice: Subject to any disclaimer, the term of this patent is extended or adjusted under 35 U.S.C. 154(b) by 0 days.

(21) Appl. No.: 09/890,898

(22) PCT Filed: Feb. 16, 1999

(86) PCT No.: PCT/JP99/00667

§ 371 (c)(1),
(2), (4) Date: Mar. 25, 2002

(87) PCT Pub. No.: WO00/49604

PCT Pub. Date: Aug. 24, 2000

(51) Int. Cl.[7] .............................................. G11B 21/02
(52) U.S. Cl. ........................................................ 360/75
(58) Field of Search ........................ 360/75, 25, 77.12, 360/77.13, 313; 369/13.02, 14; 216/65

(56) References Cited

U.S. PATENT DOCUMENTS

| | | |
|---|---|---|
| 2,923,781 A | 2/1960 | Gordon et al. |
| 3,404,392 A | 10/1968 | Sordello |
| 3,426,337 A | 2/1969 | Black et al. |
| 3,637,991 A | 1/1972 | Yanagawa |
| 3,662,120 A | 5/1972 | Hess |
| 3,768,752 A | 10/1973 | Bettini et al. |
| 3,790,755 A | 2/1974 | Silverman |
| 3,838,291 A | 9/1974 | Marion et al. |
| 3,914,793 A | 10/1975 | Burnham |
| 3,916,039 A | 10/1975 | Akashi et al. |
| 3,980,480 A | 9/1976 | Lairidon et al. |
| 4,008,085 A | 2/1977 | Lemahieu et al. |

(List continued on next page.)

FOREIGN PATENT DOCUMENTS

| | | |
|---|---|---|
| CH | 586 944 | 4/1977 |
| DE | 24 06 292 | 8/1975 |
| DE | 26 16 362 | 11/1977 |
| DE | 32 01 935 | 8/1983 |
| DE | 34 17 426 | 11/1985 |
| DE | 41 42 052 | 7/1992 |
| EP | 0 069 548 | 1/1983 |
| EP | 0 083 753 | 7/1983 |
| EP | 0 097 774 | 1/1984 |
| EP | 0 108 258 | 5/1984 |
| EP | 0 119 568 | 9/1984 |
| EP | 0 130 495 | 1/1985 |
| EP | 0 155 000 | 9/1985 |
| EP | 0 166 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |

(List continued on next page.)

*Primary Examiner*—David Hudspeth
*Assistant Examiner*—K. Wong
(74) *Attorney, Agent, or Firm*—Morrison & Foerster LLP

(57) ABSTRACT

A method of writing servo signals on a magnetic tape which comprises irradiating one end of an optical fiber bundle (12) comprising a plurality of optical fibers (11) arrayed in parallel with each other with laser light, transmitting the laser light (24) emitted from the other end as an output light source through a condensing lens (13), and irradiating a site of a magnetic tape running at a prescribed speed, the site being capable of forming servo tracks, with the laser light passed through the condensing lens (13) to form real images (25) equal to or smaller in size than the output light source to cause the site to change physically or chemically thereby forming a plurality of servo track patterns (S) in the longitudinal direction of the tape at a smaller pitch than the pitch of the optical fibers (11) arrayed in the optical fiber bundle (12).

18 Claims, 3 Drawing Sheets

U.S. PATENT DOCUMENTS

| | | | |
|---|---|---|---|
| 4,123,788 A | 10/1978 | Kruger | |
| 4,176,381 A | 11/1979 | de Niet et al. | |
| 4,275,425 A | 6/1981 | Watanabe et al. | |
| 4,313,143 A | 1/1982 | Zarr | |
| 4,315,283 A | 2/1982 | Kinjo et al. | |
| 4,340,305 A | 7/1982 | Smith et al. | |
| 4,371,904 A | 2/1983 | Brooke | |
| 4,380,032 A | 4/1983 | Pfost | |
| 4,424,111 A | 1/1984 | Zielke et al. | |
| 4,558,383 A | 12/1985 | Johnson | |
| 4,570,191 A | 2/1986 | Di Stefano et al. | |
| 4,578,311 A | 3/1986 | Ishikuro et al. | |
| 4,581,529 A | 4/1986 | Gordon | |
| 4,626,469 A | 12/1986 | Yamaguchi et al. | |
| 4,633,451 A | 12/1986 | Ahn et al. | |
| 4,679,104 A | 7/1987 | Dahlerud | |
| 4,737,877 A | 4/1988 | Krongelb et al. | |
| 4,743,091 A | 5/1988 | Gelbart | |
| 4,746,542 A | 5/1988 | Chino et al. | |
| 4,750,067 A | 6/1988 | Gerfast | |
| 4,802,030 A | 1/1989 | Henry et al. | |
| 4,816,939 A | 3/1989 | Ford et al. | |
| 4,816,941 A | 3/1989 | Edel et al. | |
| 4,843,494 A | 6/1989 | Cronin et al. | |
| 4,848,698 A | 7/1989 | Newell et al. | |
| 4,868,046 A | 9/1989 | Moriizumi et al. | |
| 4,875,969 A | 10/1989 | Hsu et al. | |
| 4,876,886 A | 10/1989 | Bible et al. | |
| 4,884,260 A | 11/1989 | Bouldin et al. | |
| 4,935,835 A | 6/1990 | Godwin et al. | |
| 4,937,810 A | 6/1990 | Drexler et al. | |
| 4,958,245 A | 9/1990 | Roth et al. | |
| 4,961,123 A | 10/1990 | Williams et al. | |
| 4,969,058 A | 11/1990 | Williams et al. | |
| 4,983,496 A | 1/1991 | Newell et al. | |
| 4,996,677 A * | 2/1991 | Naito et al. | 369/14 |
| 5,008,765 A | 4/1991 | Youngquist | |
| 5,016,240 A | 5/1991 | Strandjord et al. | |
| 5,038,030 A | 8/1991 | Hayashi et al. | |
| 5,050,017 A | 9/1991 | Carr et al. | |
| 5,065,387 A | 11/1991 | Roth et al. | |
| 5,067,039 A | 11/1991 | Godwin et al. | |
| 5,097,351 A | 3/1992 | Kramer | |
| 5,105,322 A | 4/1992 | Steltzer | |
| 5,120,927 A | 6/1992 | Williams et al. | |
| 5,121,371 A | 6/1992 | Farnsworth et al. | |
| 5,163,032 A | 11/1992 | Van Nieuwland et al. | |
| 5,179,463 A | 1/1993 | Kramer | |
| 5,196,297 A | 3/1993 | Dombrowski et al. | |
| 5,196,969 A | 3/1993 | Iwamatsu et al. | |
| 5,210,672 A | 5/1993 | Ivers et al. | |
| 5,229,620 A | 7/1993 | Pahr | |
| 5,262,908 A | 11/1993 | Iwamatsu et al. | |
| 5,279,775 A | 1/1994 | Thomas et al. | |
| 5,280,402 A | 1/1994 | Anderson et al. | |
| 5,283,773 A | 2/1994 | Thomas et al. | |
| 5,311,378 A | 5/1994 | Williams et al. | |
| 5,319,507 A | 6/1994 | Umebayashi et al. | |
| 5,322,987 A | 6/1994 | Thomas et al. | |
| 5,333,091 A | 7/1994 | Iggulden et al. | |
| 5,349,484 A | 9/1994 | Koehler | |
| 5,363,255 A | 11/1994 | Ivers et al. | |
| 5,369,631 A | 11/1994 | Hwang | |
| 5,371,636 A | 12/1994 | Nayak et al. | |
| 5,379,283 A | 1/1995 | Miyajima | |
| 5,379,710 A | 1/1995 | Parnigoni | |
| 5,414,578 A | 5/1995 | Lian et al. | |
| 5,414,585 A | 5/1995 | Saliba | |
| 5,432,652 A | 7/1995 | Comeaux et al. | |
| 5,448,430 A | 9/1995 | Bailey et al. | |
| 5,450,257 A | 9/1995 | Tran et al. | |
| 5,452,152 A | 9/1995 | Rudi | |
| 5,457,586 A | 10/1995 | Solhjell | |
| 5,462,823 A | 10/1995 | Evans et al. | |
| 5,510,140 A | 4/1996 | Kurose et al. | |
| 5,515,212 A | 5/1996 | Chiao et al. | |
| 5,518,804 A | 5/1996 | Mizuno et al. | |
| 5,523,904 A | 6/1996 | Saliba | |
| 5,532,042 A | 7/1996 | Kawarai et al. | |
| 5,535,069 A | 7/1996 | Chiao et al. | |
| 5,563,868 A | 10/1996 | Farnsworth et al. | |
| 5,566,033 A | 10/1996 | Frame et al. | |
| 5,589,247 A | 12/1996 | Wallack et al. | |
| 5,615,205 A | 3/1997 | Belser | |
| 5,661,616 A | 8/1997 | Tran et al. | |
| 5,661,823 A | 8/1997 | Yamaguchi et al. | |
| 5,674,583 A | 10/1997 | Nakayama et al. | |
| 5,675,448 A | 10/1997 | Molstad et al. | |
| 5,677,806 A | 10/1997 | Eckberg et al. | |
| 5,680,278 A | 10/1997 | Sawtell, Jr. | |
| 5,689,384 A | 11/1997 | Albrecht et al. | |
| 5,696,755 A | 12/1997 | Leonhardt | |
| 5,705,268 A | 1/1998 | Ishikawa et al. | |
| 5,718,964 A | 2/1998 | Naoe et al. | |
| 5,726,834 A | 3/1998 | Eckberg et al. | |
| 5,774,313 A | 6/1998 | Tanaka et al. | |
| 5,815,482 A | 9/1998 | Rope et al. | |
| 5,855,589 A | 1/1999 | McEwen et al. | |
| 5,858,589 A | 1/1999 | Govaert et al. | |
| 5,872,675 A | 2/1999 | Solhjell | |
| 5,877,910 A | 3/1999 | Williams et al. | |
| 5,993,948 A | 11/1999 | Yamazaki et al. | |
| 6,018,434 A * | 1/2000 | Saliba | 360/77.13 |
| 6,033,752 A | 3/2000 | Suzuki et al. | |
| 6,063,489 A | 5/2000 | Kobayashi et al. | |
| 6,075,678 A | 6/2000 | Saliba | |
| 6,084,740 A | 7/2000 | Leonhardt et al. | |
| 6,103,365 A | 8/2000 | Ishii et al. | |
| 6,108,159 A | 8/2000 | Nute et al. | |
| 6,236,529 B1 | 5/2001 | Leonhardt et al. | |
| 6,246,535 B1 | 6/2001 | Saliba et al. | |
| 6,365,061 B1 * | 4/2002 | Damer et al. | 216/65 |
| 6,396,773 B1 * | 5/2002 | Kuo | 369/13.02 |
| 6,429,411 B1 * | 8/2002 | Iwasaki et al. | 250/201.5 |
| 6,433,951 B1 * | 8/2002 | Lubratt | 360/77.12 |
| 2001/0006437 A1 | 7/2001 | Leonhardt et al. | |

FOREIGN PATENT DOCUMENTS

| | | |
|---|---|---|
| EP | 0 311 485 | 4/1989 |
| EP | 0 311 859 | 4/1989 |
| EP | 0 336 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |
| EP | 0 390 555 | 10/1990 |
| EP | 0 423 662 | 4/1991 |
| EP | 0 434 230 | 6/1991 |
| EP | 0 443 810 | 8/1991 |
| EP | 0 535 112 | 12/1991 |
| EP | 0 484 774 | 5/1992 |
| EP | 0 484 775 | 5/1992 |
| EP | 0 484 779 | 5/1992 |
| EP | 0 484 780 | 5/1992 |
| EP | 0 496 132 | 7/1992 |
| EP | 0 496 461 | 7/1992 |
| EP | 0 549 845 | 7/1993 |

| | | | | | |
|---|---|---|---|---|---|
| EP | 0 549 854 | 7/1993 | JP | 7-065434 | 3/1995 |
| EP | 0 555 511 | 8/1993 | JP | 7-220255 | 8/1995 |
| EP | 0 564 187 | 10/1993 | JP | 7-082626 | 9/1995 |
| EP | 0 645 043 | 12/1993 | JP | 7-508119 | 9/1995 |
| EP | 0 645 044 | 12/1993 | JP | 8-174669 | 7/1996 |
| EP | 0 655 960 | 12/1993 | JP | 9-007131 | 1/1997 |
| EP | 0 598 503 | 5/1994 | JP | 9-033773 | 2/1997 |
| EP | 0 606 710 | 7/1994 | JP | 9-035246 | 2/1997 |
| EP | 0 684 597 | 11/1995 | JP | 9-288813 | 9/1997 |
| EP | 0 854 471 | 7/1998 | JP | 9-293230 | 9/1997 |
| EP | 1 026 665 | 8/2000 | JP | 9-265626 | 10/1997 |
| EP | 1 026 666 | 8/2000 | JP | 9-289885 | 11/1997 |
| EP | 1 026 667 | 8/2000 | JP | 9-289973 | 11/1997 |
| EP | 1 117 092 | 7/2001 | JP | 9-297914 | 11/1997 |
| EP | 1 205 912 | 5/2002 | JP | 9-320197 | 12/1997 |
| EP | 1 205 913 | 5/2002 | JP | 10-043924 | 2/1998 |
| FR | 2 315 142 | 1/1977 | JP | 10-190867 | 7/1998 |
| GB | 2 008 290 | 5/1979 | JP | 10-251432 | 9/1998 |
| GB | 1 595 136 | 8/1981 | JP | 10-297181 | 11/1998 |
| GB | 2 121 227 | 12/1983 | JP | 11-066529 | 3/1999 |
| GB | 2 335 785 | 9/1999 | JP | 11-066745 | 3/1999 |
| JP | 56-111169 | 9/1981 | JP | 11-096705 | 4/1999 |
| JP | 57-050346 | 3/1982 | JP | 11-126328 | 5/1999 |
| JP | 57-120230 | 7/1982 | JP | 11-154312 | 6/1999 |
| JP | 57-120255 | 7/1982 | JP | 11-161928 | 6/1999 |
| JP | 61-142530 | 6/1986 | JP | 11-213383 | 8/1999 |
| JP | 61-293372 | 12/1986 | JP | 11-213384 | 8/1999 |
| JP | 62-192025 | 8/1987 | JP | 11-242814 | 9/1999 |
| JP | 63-148416 | 6/1988 | JP | 11-339254 | 12/1999 |
| JP | 63-251924 | 10/1988 | JP | 11-353642 | 12/1999 |
| JP | 64-070916 | 3/1989 | JP | 2001-048351 | 2/2001 |
| JP | 2-169915 | 6/1990 | JP | 2001-067652 | 3/2001 |
| JP | 3-094881 | 4/1991 | JP | 2001-076326 | 3/2001 |
| JP | 3-141087 | 6/1991 | KR | 9406847 | 7/1994 |
| JP | 3-201215 | 9/1991 | RU | 1137513 | 1/1985 |
| JP | 3-219432 | 9/1991 | WO | WO 83/01858 | 5/1983 |
| JP | 3-242816 | 10/1991 | WO | WO 85/02933 | 7/1985 |
| JP | 4-003832 | 1/1992 | WO | WO 85/03376 | 8/1985 |
| JP | 4-038632 | 2/1992 | WO | WO 88/02168 | 3/1988 |
| JP | 4-059399 | 2/1992 | WO | WO 94/12975 | 6/1994 |
| JP | 4-252417 | 9/1992 | WO | WO 99/21178 | 4/1999 |
| JP | 4-305844 | 10/1992 | WO | WO 99/21179 | 4/1999 |
| JP | 5-073883 | 3/1993 | WO | WO 99/27530 | 6/1999 |
| JP | 6-020414 | 1/1994 | WO | WO 99/28909 | 6/1999 |
| JP | 6-139549 | 5/1994 | WO | WO 00/49604 | 8/2000 |
| JP | 6-243619 | 9/1994 | WO | WO 00/49605 | 8/2000 |
| JP | 6-259736 | 9/1994 | WO | WO 00/49607 | 8/2000 |
| JP | 7-029136 | 1/1995 | | | |
| JP | 7-057412 | 3/1995 | | | |

\* cited by examiner

METHOD OF WRITING SERVO SIGNAL ON MAGNETIC TAPE

TECHNICAL FIELD

The present invention relates to a method and an apparatus for writing servo signals on a magnetic tape, by which servo tracks can be formed at a small pitch.

BACKGROUND ART

One of means for increasing the recording capacity of magnetic tape is to increase the density of data tracks. However, as the track density increases, the distance between adjacent data tracks is shortened, and it becomes more likely that the magnetic head strays off the right position during data recording or reproduction, failing to keep accuracy of recording or reproduction. Various servo tracking systems have been proposed to address this problem.

One of typical servo tracking systems for magnetic tape is formation of servo tracks corresponding to servo signals on a magnetic tape magnetically or by mechanical stamping. According to this system, the smaller the distance between servo tracks formed, the more accurate the servo control. To achieve this, however, a complicated or large-sized apparatus is required.

Accordingly, an object of the present invention is to provide a method and an apparatus for writing servo signals on a magnetic tape which will make it possible to easily form a large number of servo tracks at a small pitch.

DISCLOSURE OF THE INVENTION

The present invention accomplishes the above object by providing a method of writing servo signals on a magnetic tape which comprises irradiating one end of an optical fiber bundle comprising a plurality of optical fibers arrayed in parallel with each other with laser light, transmitting the laser light emitted from the other end as an output light source through a condensing lens, and irradiating a site of a magnetic tape running at a prescribed speed, the site being capable of forming servo tracks, with the laser light passed through the condensing lens to form real images equal to or smaller in size than the output light source to cause the site to change physically or chemically thereby forming a plurality of servo track patterns in the longitudinal direction of the tape at a smaller pitch than the pitch of the optical fibers arrayed in the optical fiber bundle.

The present invention also provides an apparatus for writing servo signals on a magnetic tape, which is preferably used to carry out the above-mentioned method, which comprises a system for running magnetic tape, a system for writing servo signals on the magnetic tape (hereinafter, servo signal writing system), and a light source system providing laser light incident upon the servo signal writing system, wherein:

the servo signal writing system has an optical fiber bundle where a plurality of optical fibers are arrayed in parallel to each other with the center axes of the individual optical fibers being coplanar and a condensing lens which receives the laser light emitted from the end of the optical fiber bundle, the optical fiber bundle and the lens being disposed such that the direction in which real images of the output laser light source formed through the lens are aligned and the running direction of the magnetic tape may make an angle larger than 0° and smaller than 90° when viewed from above.

The present invention also provides an apparatus for writing servo signals on a magnetic tape which comprises a system for running magnetic tape, a system for writing servo signals on the magnetic tape (hereinafter, servo signal writing system), and a light source system providing laser light incident upon the servo signal writing system, wherein:

the servo signal writing system has a group of two or more optical fiber bundles each having a plurality of optical fibers arrayed in parallel to each other with the center axes of the individual optical fibers being coplanar, the optical fiber bundles being superposed on each other in such a manner that real images may be formed at a smaller pitch than the pitch of real images formed by the individual optical fiber bundles.

BEST MODE FOR CARRYING OUT THE INVENTION

Figure 1:
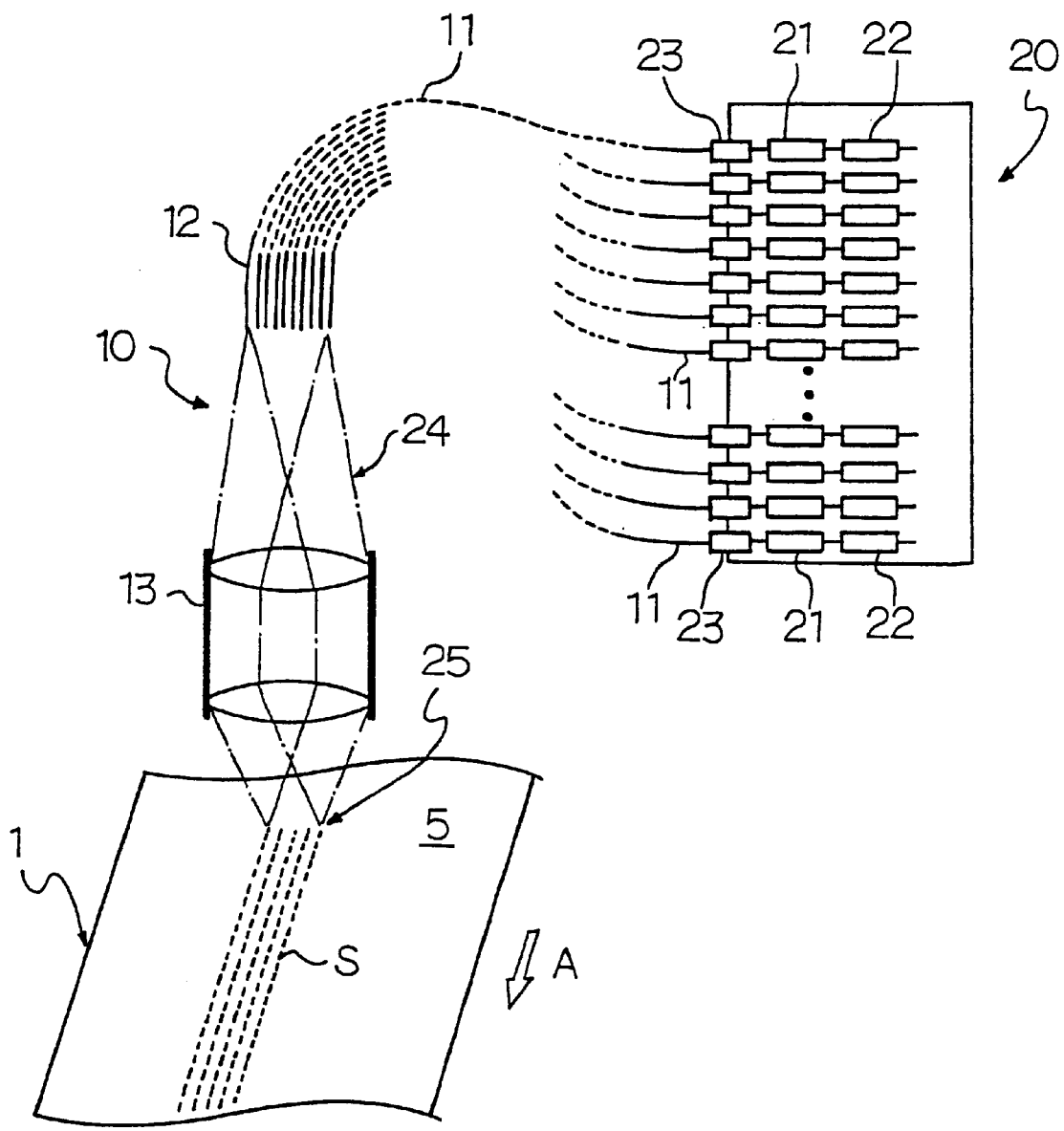
FIG. 1 schematically illustrates a first embodiment of the servo signal writing apparatus according to the present invention.
Figure 2:
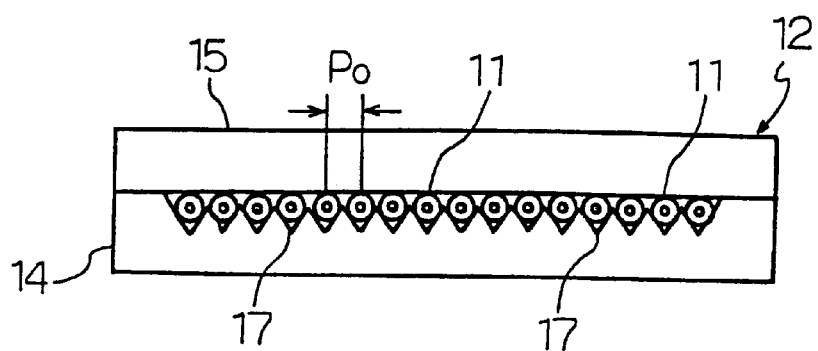
FIG. 2 is a schematic cross section showing the structure of an optical fiber bundle.
Figure 3:
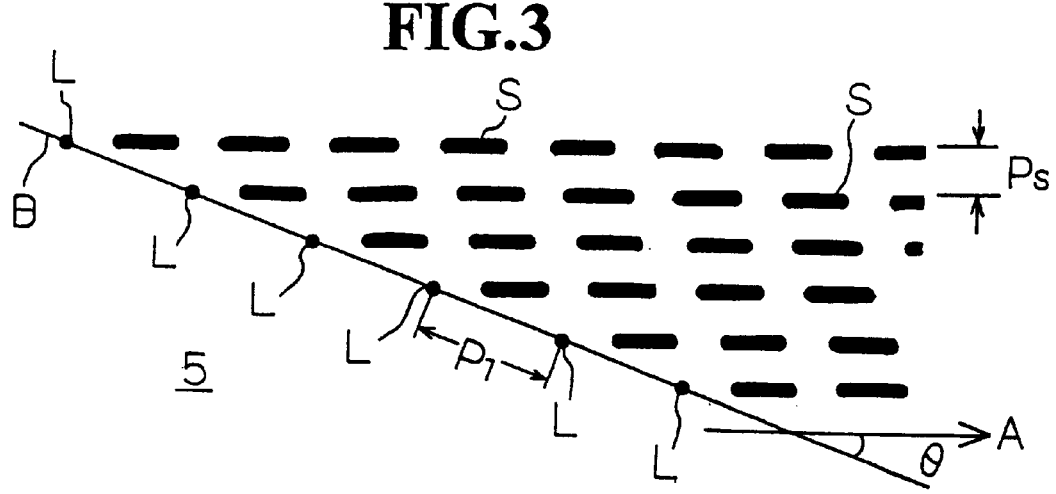
FIG. 3 schematically shows the way of forming servo tracks on magnetic tape, seen from above.

The present invention will be hereunder described with reference to its preferred embodiments by way of the accompanying drawings. FIGS. 1 through 3 illustrate a first embodiment of the servo signal writing apparatus according to the present invention. As shown in FIG. 1, the apparatus has a magnetic tape running system (not shown), a servo signal writing system 10 for writing servo signals on the magnetic tape 1, and a light source system 20 providing laser light incident on the servo signal writing system 10.

The magnetic tape running system comprises a feed reel having a magnetic tape, on which servo tracks are to be formed, wound therearound, a take-up reel for taking up the fed magnetic tape, and a driving means for revolving these reels. These members are set to make magnetic tape 1 run in direction A. Such a running system has the same mechanism as that in a conventional magnetic tape recording and reproducing drive. While not shown, the running system also has a means for regulating either edge of the running magnetic tape 1, by which fluctuation of the running magnetic tape 1 in the width direction may be prevented thereby to keep the distance from that edge to each servo track pattern constant.

The light source system 20 for laser light comprises as many modules 21 as optical fibers hereinafter described, each module having a laser diode optically connected to each optical fiber, driving means 22 for driving the individual laser diodes, and connectors 23 which optically connect the individual modules 21 to an external fiber bundle. The driving means 22 is electrically connected to a controller therefore (not shown) composed of an oscillator, etc. and operates according to the instructions given from the controller. The operation of the driving means 22 makes the laser diode in each module 21 emit light at a prescribed time interval.

The servo signal writing system 10 comprises an optical fiber bundle 12 where a plurality of optical fibers 11 are arrayed in parallel with each other with their center axes being coplanar and a condensing lens 13 having a large aperture which receives and converges output laser light 24 emitted from the emission end of the optical fiber bundle 12. The incidence side end of the optical fibers 11 are optically connected to the respective connectors 23 of the light source system 20. The condensing lens 13 is capable of capturing 70% or more, preferably 95% or more, of the output laser light 24 emitted from the emission end of the optical fiber bundle 12. The condensing lens 13 is disposed at such a position as to form real images 25 on the site of the running magnetic tape 1 where servo tracks can be formed (on the backcoating layer 5 in the present embodiment), the images 25 being equal to or smaller in size than the output light source, i.e., the line of spots of emitted laser light 24 (aligned output laser light 24), preferably 0.8 or smaller times as large as the output light source. In other words, the condensing lens 13 constitutes a reduction projection optical system.

As shown in FIG. 2, the optical fiber bundle 12 comprises a lower flat plate 14 of prescribed thickness having on one side thereof many grooves 17 (preferably V-shaped) which are straight and parallel to each other, optical fibers 11 put in the grooves 17 one by one, and an upper flat plate 15 covering the optical fibers 11. The groove 17 are such that the center axes of the individual optical fibers 11 may be coplanar. The grooves 17 are provided at such a regular interval that the distance between every adjacent optical fibers 11, i.e., the pitch $P_0$ of the optical fibers 11 may be equal to the diameter of the optical fibers 11.

The optical fiber bundle 12 is disposed such that the direction in which the real images 25 of the output light source which are formed through the condensing lens 13 on the magnetic tape 1 are aligned (i.e., the direction of the line of spots of the output laser light 24 emitted from the optical fiber bundle 12) and the running direction of the magnetic tape 1 may make an angle θ (see FIG. 3, described later) larger than 0° and smaller than 90° in their plan view. In detail, the optical fiber bundle 12 is disposed in such a manner that the direction in which the optical fibers 11 are arrayed to make up the optical fiber bundle 12 is tilted at an angle larger than 0° and smaller than 90° with the magnetic tape 1 running direction in their plan view.

The method for forming servo tracks on the magnetic tape 1 by the use of the above-described apparatus is hereinafter explained. The laser diodes of the modules 21 in the light source system 20 are made to emit light at a prescribed time interval. The emitted laser light enters the respective optical fibers 11 and is emitted from the emission end of the optical fiber bundle 12. The emitted laser light 24 passes through the condensing lens 13 and irradiates the backcoating layer 5 of the magnetic tape 1 running at a prescribed speed. As a result, real images 25 are formed on the backcoating layer 5, which images are equal to or smaller than the line of spots of the output laser light 24 at the emission end of the optical fiber bundle 12. The irradiated part of the backcoating layer 5 undergoes a physical or chemical change to form a servo track pattern along the longitudinal direction of the tape. FIG. 3 shows formation of real images 25 on the backcoating layer 5 by which servo track patterns are formed. In FIG. 3, arrow A is the magnetic tape running direction, and line B is the direction of the aligned spots of the output laser light as real images 25. Symbols L's each indicate the irradiation position of the output laser light in the image 25 formed on the backcoating layer 5. Symbols S's each indicate the formed servo track pattern. In FIG. 3, the distance $P_1$ between adjacent irradiation positions of the output laser light (L—L distance) in the images formed on the backcoating layer 5 can be expressed by using the above-described $P_0$ (see FIG. 2) and the (reducing) magnification m of the condensing lens 13 (m is an integer greater than 0 and not greater than 1), being represented by $P_1 = P_0 m$.

As stated above, the alignment direction of the images 25 of the output laser light 24 emitted from the optical fiber bundle 12 and the magnetic tape 1 running direction form an angle θ. That is, line B and the magnetic tape 1 running direction A in FIG. 3 make an angle θ. Accordingly, the L—L separation with respect to the magnetic tape running direction, i.e., the pitch Ps of the formed servo track patterns S and S is equal to $P_1 \sin θ$, which equals to $P_0 m \sin θ$. As a result, the pitch Ps of the formed servo track patterns S and S is m sin θ times the pitch $P_0$ of the optical fibers 11 in the optical fiber bundle 12. In this manner, a plurality of servo track patterns S are formed simultaneously on the backcoating layer 5 at a pitch smaller than the pitch $P_0$ of the optical fibers 11 in the optical fiber bundle 12. Each servo track pattern S is discrete and linear in the longitudinal direction of the magnetic tape 1 as shown in FIG. 3. The shape of adjacent servo track patterns may be the same or different. It is not always necessary to form the servo track patterns over the whole length of the magnetic tape 1.

The second embodiment of the apparatus for forming servo tracks on the magnetic tape 1 is then described with reference to FIG. 4. The second embodiment will be described only as to particulars different from the aforementioned first embodiment. The description about the first embodiment appropriately applies to the same particulars. The members of FIG. 4 that are the same as in FIGS. 1 through 3 are given the same symbols.

The apparatus of this embodiment is structurally the same as that of the first embodiment except the servo signal writing system. FIG. 4 is a schematic plan view of the servo signal writing system according to the present embodiment. The condensing lens is not shown in FIG. 4. FIG. 4 represents the case where the magnification of the condensing lens is set at 1.

Figure 4:
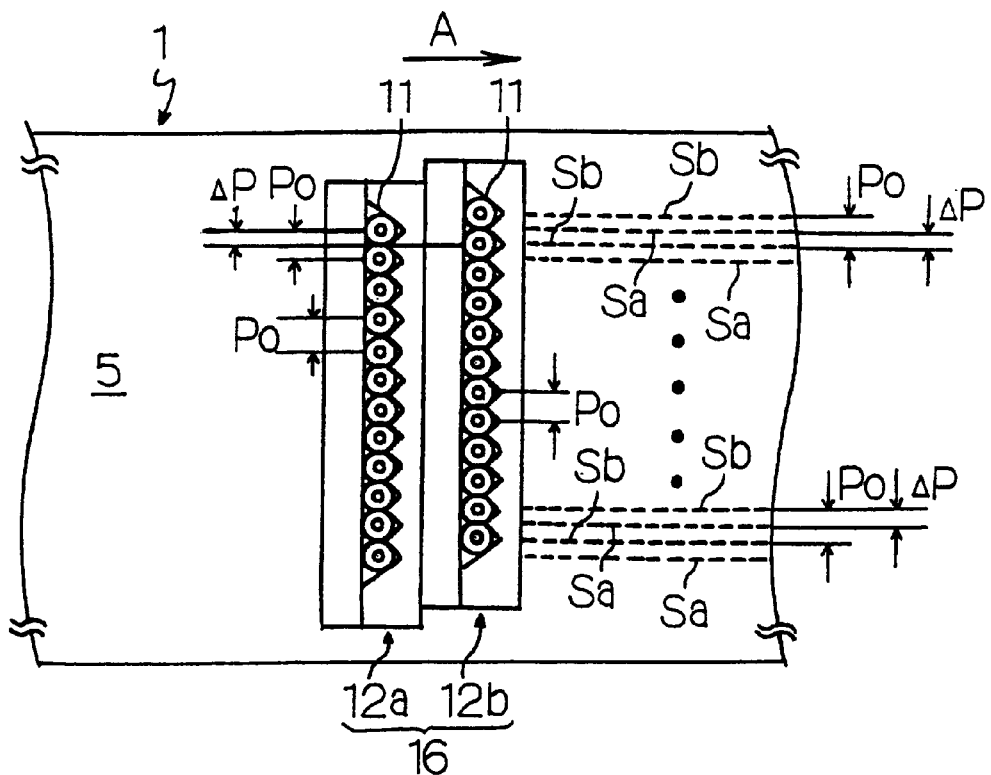
FIG. 4 is a schematic view of a servo signal writing system in a second embodiment of the servo signal writing apparatus according to the present invention.

The servo signal writing system in the apparatus of the present embodiment has an optical fiber bundle group 16 consisting of two or more optical fiber bundles 12 (two optical fiber bundles in the case of FIG. 4). The optical fibers 11 in each of the optical fiber bundles 12a and 12b, which make up the optical fiber bundle group 16, are arrayed at a pitch $P_0$. The optical fiber bundles 12a and 12b and the condensing lens (not shown) are disposed such that, when viewed from above, the alignment of real images formed of the output laser light from each optical fiber bundle 12a or 12b through the condensing lens on the magnetic tape 1 is perpendicular to the magnetic tape 1 running direction A and each image is formed along the running direction A. More specifically, each of the optical fiber bundles 12a and 12b is disposed along the magnetic tape 1 running direction A in such a manner that the direction of the array of the optical fibers 11 may be perpendicular to the magnetic tape 1 running direction A. The optical fiber bundles 12a and 12b are superposed on each other in such a manner as to form real images at a smaller pitch than the pitch of the real images formed by the individual optical fiber bundle. More specifically, the optical fiber bundles 12a and 12b are superposed on each other in such a manner that the real images formed by one of the optical fiber bundles are shifted from those formed by the other by a distance ΔP that is smaller than the pitch (=$P_0$ in the present embodiment) of the real images formed by the individual optical fiber bundles (the distance ΔP equals $P_0/2$ in the present embodiment).

The manner of forming servo tracks by the use of the apparatus according to the present embodiment is explained with reference to FIG. 4. Output laser light emitted from the optical fiber bundle 12a that is disposed upstream in the magnetic tape 1 running direction passes through the condensing lens (not shown) and irradiates the backcoating layer 5 of the magnetic tape 1 while forming real images to form servo track patterns Sa, Sa . . . at a pitch of $P_0$. Output laser light emitted from the optical fiber bundle 12b that is disposed downstream irradiates the backcoating layer 5 of the magnetic tape 1 in the same manner while forming real images to form servo track patterns Sb, Sb . . . at a pitch of $P_0$, each servo track pattern Sb being in the middle between adjacent servo track patterns Sa and Sa. Since the optical fiber bundles 12a and 12b and the condensing lens are arranged so that the real images formed by one of the bundles and those formed by the other are shifted from each other by $\Delta P$, i.e., $P_0/2$, the distance between every adjacent servo tracks Sa and Sb also equals to $\Delta P$, i.e., $P_0/2$. A plurality of servo track patterns are thus formed simultaneously on the backcoating layer 5 at a pitch smaller than the pitch $P_0$ of the optical fibers 11 in the optical fiber bundle. The magnification m of the condensing lens can be made smaller than 1 to make the servo track pitch $\Delta Pm$, which is further smaller than that of the above example.

An exemplary magnetic tape to which the method of the present invention is applied and usage of servo tracks formed on that magnetic tape will be explained briefly. The magnetic tape comprises a substrate, a magnetic or nonmagnetic intermediate layer formed on the substrate, and a magnetic layer provided on the intermediate layer as a top layer. The substrate has on the other side a backcoating layer. The magnetic layer has formed thereon a plurality of data tracks in parallel to the magnetic tape running direction. While in the above-described embodiments the backcoating layer is used as the site capable of forming servo tracks, any other layer or the substrate may be used, or a dedicated site may be provided separately.

On being irradiated with laser light, the site capable of forming servo tracks undergo a physical or chemical change to form a servo track pattern corresponding to servo signals thereby producing an optical contrast with the non-irradiated part. While not limiting, the means of causing the servo track pattern to show an optical contrast includes (1) formation of depressions having a prescribed depth on the surface of the site, for example, the backcoating layer, 5 by irradiation with laser light (physical change) and (2) incorporation into the site a substance capable of color change on receipt of laser light (chemical change).

When the above-described magnetic tape is used, a head unit having a predetermined number of magnetic heads is moved across the magnetic tape, switching among data tracks, to record or reproduce data on the data track corresponding to each magnetic head, which is in accordance with a serpentine system. Servo tracking is carried out based on the servo tracks formed on the magnetic tape so that each magnetic head may be positioned on a right data track when a switch is made among the data tracks or during recording or reproduction. For example, the servo track pattern is irradiated with light of prescribed wavelength, and the reflected light or transmitted light is detected to optically read the servo signals. Servo tracking is carried out based on the read servo signals in the same manner as a push-pull method, etc. that is conventionally used in the field of optical disks, etc.

Preferred conditions for forming servo tracks in the present invention will then be described. The running speed of the magnetic tape is preferably as high as possible from the standpoint of productivity, but, with the ability of the running system being taken into consideration, a practically suitable speed is 1 to 5 m/sec. The output of the laser diode is preferably 5 to 30 mW at the irradiated site for forming a servo track patterns without damaging the magnetic tape. In forming the discrete servo track pattern S as shown in FIG. 3, the output of the laser diode can be modified arbitrarily according to the length and the period of the pattern.

In order to make the track pitch smaller, it is preferred for the optical fiber 11 to have as small a core diameter as possible because the core diameter is reflected on the size of the real image of the output laser light formed on the magnetic tape, i.e., the width of the servo track. Optical fibers whose core diameter is 3 to 9 $\mu$m that are practically usable are preferred. In using such optical fibers, the diameter of the output laser light will be 1 to 9 $\mu$m.

The angle $\theta$ in the first embodiment is appropriately adjustable according to the pitch of the arrayed optical fibers 11, the magnification of the condensing lens 13, the track pitch of the servo tracks to be formed, and the like.

The magnification m of the condensing lens 13 is preferably as small as possible so as to reduce the error of the servo track pitch with respect to the angle $\theta$. In connection to the focal depth and the aberration, it is preferably 0.3 to 0.8.

Figure 5:
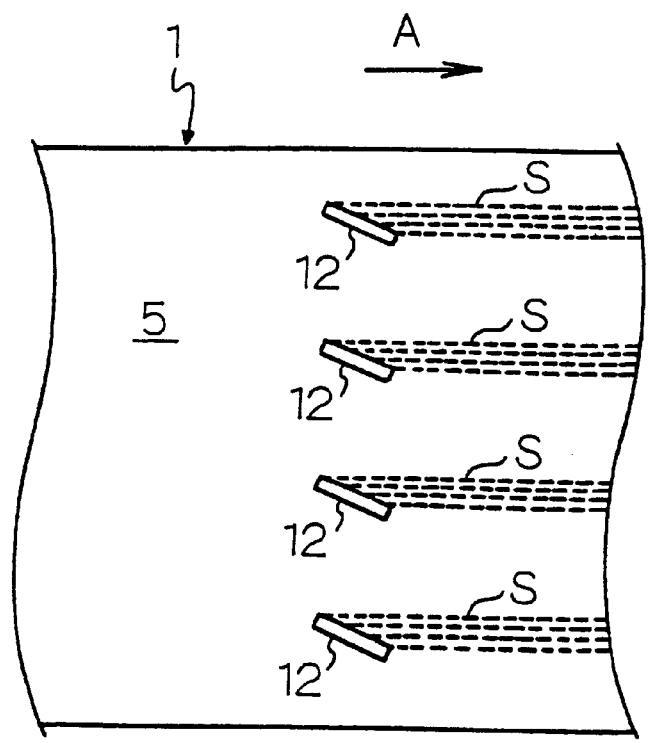
FIG. 5 schematically shows another mode of a servo signal writing system in the first embodiment.

The present invention is not limited to the above-described embodiments, and various modifications can be made therein. For example, the magnetic tape 1 to which the method of the present invention is applied can have a site other than the backcoating layer thereof as the site capable of forming servo tracks. In the first embodiment a plurality of optical fiber bundles 12 may be used as regularly spaced across the magnetic tape 1 as shown in FIG. 5 (in which the condensing lens is not shown). In the second embodiment, too, a plurality of the optical fiber bundle groups 16 shown in FIG. 4 can be used as regularly spaced across the magnetic tape 1.

In the first embodiment, tilting the alignment direction of the images formed on the magnetic tape 1 with respect to the running direction A of the magnetic tape 1 can be achieved not only by tilting the optical fiber bundle 12 itself but by tilting only the real images by means of the optical system, such as the condensing lens, of the servo signal writing system.

When the optical fiber bundle group 16 shown in FIG. 4 is disposed as tilted to make a prescribed angle with the magnetic tape running direction just like the servo signal writing system in the apparatus of FIG. 1, it is possible to form servo track patterns on the magnetic tape at a further reduced pitch. While in FIG. 4 the optical fibers 12a and 12b making up the optical fiber bundle 16 are arranged close together, they may be placed apart.

Industrial Applicability

According to the present invention, a large number of servo tracks can be formed on a magnetic tape at a small pitch simultaneously and easily. Therefore, the magnetic tape produced according to the present invention is capable of servo control with improved accuracy, and it is possible to increase the data track density, which will increase the recording capacity.

What is claimed is:

1. A method of writing servo tracks on tape which comprises irradiating a first end of an optical fiber bundle comprising a plurality of optical fibers arrayed in parallel with each other with laser light, transmitting the laser light emitted from a second end of the fiber bundle as an output light source through reducing optics, and irradiating a site of the tape, said site being capable of forming servo tracks, with the laser light transmitted through said reducing optics to form a plurality of servo track patterns in a running direction of the tape at a smaller pitch than the pitch of the optical fibers arrayed in said optical fiber bundle.

2. The method of claim 1, wherein said optical fiber bundle comprises the optical fibers arrayed with the center axes of the individual optical fibers being coplanar, and irradiation of said site with said laser light is such that the direction in which the real images of said output light source formed on the tape are aligned and the running direction of the tape may make an angle larger than 0° and smaller than 90°.

3. The method of claim 1, wherein said optical fiber bundle comprises the optical fibers arrayed with the center axes of the individual optical fibers being coplanar, two or more of said optical fiber bundles are superposed on each other in such an arrangement that real images may be formed at a smaller pitch than the pitch of the real images formed by the individual optical fiber bundles.

4. The method of claim 1, wherein said reducing optics comprise a condensing lens.

5. The method of claim 1, wherein the laser light transmitted through said reducing optics forms real images on the site having a size equal to or smaller in size than the output light source.

6. The method of claim 1, further comprising irradiating the first end of a first optical fiber in said optical fiber bundle with a first laser light, and irradiating the first end of a second optical fiber in said optical fiber bundle with a second laser light.

7. The method of claim 6, further comprising controlling the first laser light with a first controller and controlling the second laser light with a second controller.

8. The method of claim 1, wherein the tape is magnetic tape.

9. The method of claim 1, wherein the tape runs at a prescribed speed in the running direction as it is irradiated.

10. An apparatus for writing servo tracks on a tape which comprises a system for running said tape, a system for writing servo signals on said tape, and a light source system providing laser light incident upon said servo signal writing system, wherein:

said servo signal writing system has an optical fiber bundle where a plurality of optical fibers are arrayed in parallel to each other with the center axes of the individual optical fibers being coplanar and reducing optics which receives the laser light emitted from the end of said optical fiber bundle, said optical fiber bundle and said lens being disposed such that the direction in which real images of the output laser light source formed through said lens are aligned and the running direction of said magnetic tape may make an angle larger than 0° and smaller than 90°.

11. An apparatus for writing servo tracks on a tape which comprises a system for running said tape, a system for writing servo signals on said tape, and a light source system providing laser light incident upon said servo signal writing system, wherein:

said servo signal writing system has a group of two or more optical fiber bundles each having a plurality of optical fibers arrayed in parallel to each other with the center axes of the individual optical fibers being coplanar, said optical fiber bundles being superposed on each other in such a manner that real images may be formed at a smaller pitch than the pitch of real images formed by the individual optical fiber bundles.

12. An apparatus for writing servo tracks on a tape comprising:

a system for running said tape in a running direction;

a system for writing servo signals on said tape, the system for writing servo signals including an optical fiber bundle having a plurality of optical fibers arrayed in parallel with each other; and a light source system for providing laser light incident upon a first end of the fiber bundle, wherein the system for writing servo signals transmits the laser light emitted from a second end of the fiber bundle as an output light source through reducing optics to form servo track patterns on the tape in the running direction at a smaller pitch than the pitch of the optical fibers arrayed in said optical fiber bundle.

13. The apparatus of claim 12, wherein said reducing optics comprise a condensing lens.

14. The apparatus of claim 12, wherein the laser light transmitted through said reducing optics forms servo track patterns having a size equal to or smaller than the output light source.

15. The apparatus of claim 12, further comprising a first laser source for irradiating the first end of a first optical fiber in said optical fiber bundle with a first laser light, and a second laser source for irradiating the first end of a second optical fiber in said optical fiber bundle with a second laser light.

16. The apparatus of claim 15, further comprising at least one controller for controlling the first laser light with a first controller and controlling the second laser light with a second controller.

17. The apparatus of claim 12, wherein the tape is magnetic tape.

18. The apparatus of claim 12, wherein the optical fibers in the fiber bundle have center axes arrayed in a coplanar manner, at least two such optical fiber bundles are superposed on each other so that the servo tracks may be formed at a smaller pitch than the pitch of real images formed by the individual optical fiber bundles.

* * * * *